United States Patent Office 3,537,979
Patented Nov. 3, 1970

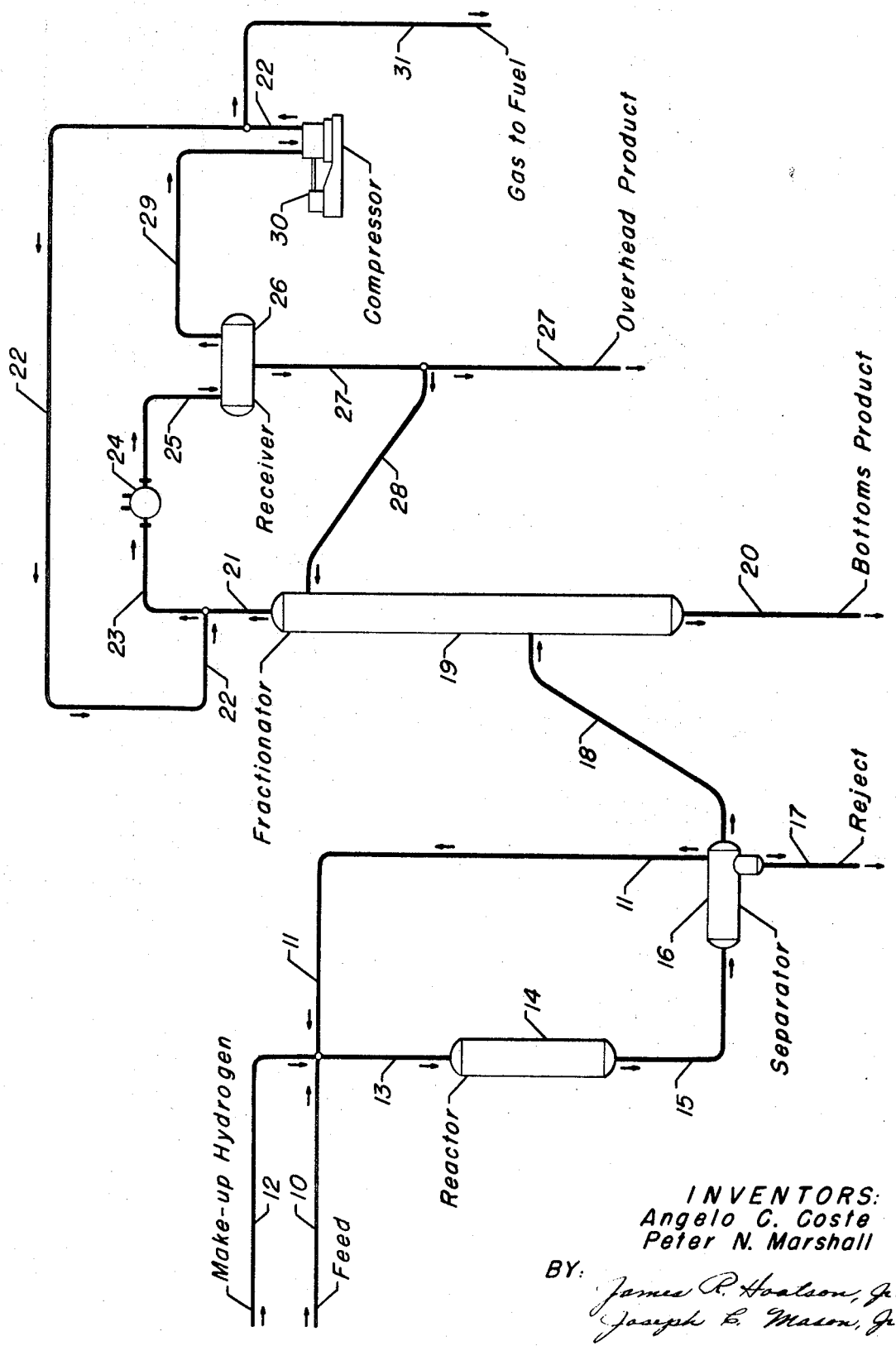

3,537,979
METHOD FOR DISTILLATION
Angelo C. Coste, Chicago, and Peter N. Marshall, Mount Prospect, Ill., assignors to Universal Oil Products Company, Des Plaines, Ill., a corporation of Delaware
Filed Dec. 6, 1968, Ser. No. 781,886
Int. Cl. C10g 7/00
U.S. Cl. 208—103            3 Claims

ABSTRACT OF THE DISCLOSURE

Method for distilling a multi-component mixture, such as the hydrocarbon effluent from a gas-oil hydrogenation reaction zone, which utilizes a fractionating column operating in conjunction with overhead vapor compressing means whereby a portion of the overhead gases is compressed and returned in admixture with the total overhead stream at a locus prior to the overhead condensing system.

BACKGROUND OF THE INVENTION

This invention relates to a method for distillation. It particularly relates to a method for separating and recovering desired products from hydrocarbon effluent of a gas-oil hydrogenation conversion zone.

The practice of distillation is widely used in the chemical and petroleum industries for separating and recovering desired products usually manufactured through chemical reaction or usually obtainable from raw materials such as crude petroleum. In today's complex economy, it has become increasingly apparent that the engineering tool of distillation must be further improved in order to make such operation more economically attractive.

Accordingly, prior art schemes have developed various techniques for maintaining fractionating columns in thermal balance, such as dual internally located reboiler systems, side-cut strippers, overhead partial condensers, and the like, each of which is familiar to those skilled in the art. In virtually every prior art scheme there is embodied a desire for minimizing the cost of obtaining desirable and predetermined products from a multi-component feed mixture. In many cases, the number of desired components makes it impractical to utilize a single fractionating column so that prior art schemes have frequently resorted to a plurality of fractionators in series commonly called a "distillation train" in order to separate and recover the desired and predetermined products.

Additionally, the chemical industry and to a considerable extent the petroleum industry have resorted to hydrogenation techniques with ever-increasing regularity. The hydrogenation reaction, of course, requires careful control of operating conditions, but also embodies significant operating difficulties, such as recovery of relatively pure hydrogen for recycle purposes. As those skilled in the art are aware, the hydrogenation reaction also produces normally gaseous hydrocarbons in commercially significant quantities so that ultimate recovery of the $C_1$ to $C_4$ (i.e. normally gaseous) hydrocarbons becomes increasingly desirable. In addition, with heavy stocks, such as those in the gas-oil boiling range, the distillation conditions are relatively severe, i.e., the bottoms temperature approaches 800° F. before sufficient vapors are generated for distillation conditions. However, it has been found that a temperature in excess of 780° F. causes deterioration, e.g. decolorization, of the products from thermal cracking, polymerization, etc. of the heavier components.

Accordingly, since the art of distillation is essential to the successful practice of chemical processing, it would be desirable to further improve upon the prior art distillation methods.

SUMMARY OF THE INVENTION

Therefore, it is an object of this invention to provide an improved method for distillation.

It is another object of this invention to provide an improved method for distilling a multi-component hydrocarbon feed mixture containing both normally liquid hydrocarbons and normally gaseous hydrocarbons.

It is a specific object of this invention to provide an improved method for separating and recovering desired products from the hydrocarbon effluent of a gas-oil hydrogenation conversion zone in a facile and economical manner.

Accordingly, one embodiment of this invention provides a method for distillation which comprises: (a) passing said hydrocarbon effluent to be separated in a fractionation zone at a temperature from 400° F. to 600° F. and a pressure from 2 p.s.i.g. to 50 p.s.i.g.; (b) removing from said zone a bottoms product comprising relatively heavy gas-oil at a temperature less than 780° F., and an overhead fraction comprising a mixture of normally liquid hydrocarbons, hydrogen, hydrogen sulfide, and normally gaseous hydrocarbons at a temperature from 250° F. to 400° F. and a pressure from 0 p.s.i.g. to 25 p.s.i.g.; (c) admixing said overhead fraction with a hereinafter specified gaseous stream; (d) cooling said admixture to a temperature from 60° F. to 120° F.; (e) separating the cooled admixture into a gaseous hydrocarbon fraction comprising hydrogen, hydrogen sulfide, and normally gaseous hydrocarbons, and a liquid hydrocarbon stream comprising relatively light gas-oil; (f) compressing said gaseous hydrocarbon fraction of Step (e) to a pressure at least 25 p.s.i. higher than said overhead pressure of Step (b); (g) passing a portion of said compressed gaseous stream into admixture with said overhead fraction as specified in Step (c); and, (h) recovering said gas-oil stream of Step (e), and the remainder of said compressed gaseous stream as separate product streams.

In essence, therefore, it can be seen from the embodiments of the invention presented thus far that the present invention is predicated upon the discovery that separating an overhead gaseous fraction into a liquid portion and a gaseous portion followed by compressing the gaseous portion and recontacting the compressed portion with the total overhead stream achieves improved results in terms of increased recovery of the desired normally gaseous hydrocarbons in a facile and economical manner, and permits the operation of the column under conditions which do not exceed 780° F. in the bottom of the column.

DETAILED DESCRIPTION OF THE INVENTION

Illustrative of feedstocks which may be satisfactory for processing through the inventive method includes hydrocarbon sources boiling in the middle and upper ranges of petroleum fractions and in some cases containing sulfur and nitrogen contaminants. If desired, the contaminants are conventionally removed through the well known conversion reaction of hydrogenation. Preferably, the present inventive method separates and recovers desired products from the hydrocarbon effluent of a hydrogenation conversion zone boiling mainly within the gas-oil boiling range, e.g. from about 320° F. to about 675° F. Since the hydrogenation reaction is designed primarily to remove these sulfur and nitrogen contaminants, the boiling range of the feedstock and the boiling range of the hydrocarbon effluent are, for all practical purposes, the same. However, as with most chemical reactions, there is a certain amount of fragmentation or cracking which produces, particularly in a hydrogen atmosphere, normally gaseous hydrocarbons ranging from methane to butane.

The hydrogenation reaction to which this invention is particularly directed utilizes catalyst, preferably, selected from one of the platinum group metals of Group VIII of the Periodic Table compositied with a refractory support, such as alumina, magnesia, zirconia, silica, or combinations of these metal oxides containing from 0.01 to 2.0 percent by weight of the platinum group metal on the composite or support. Utilizing a catalyst of this type, the hydrogenation reaction may be effected at temperatures from 300° F. to 1000° F., at pressures from 300 p.s.i.g. to 1000 p.s.i.g., and a hydrogen to hydrocarbon mol ratio of from 0.5:1 to 20:1.

Other suitable catalysts for certain hydrogenation reactions include an iron group metal of Group VIII of the Periodic Table with a sulfide of a metal selected from the righthand columns of Groups V and VI of the Periodic Table, such as vanadium, niobium, tantalum, chromium, etc. supported on one of the aforementioned refractory metal oxides, such as alumina, zirconia, etc. The preferred iron group metals are nickel and cobalt and the preferred metal sulfides are the thiomolybdates, thiovanadates, and the sulfides of niobium and chromium.

Those skilled in the art are familiar with hydrogenation reactions so additional details thereof need not be presented here.

The effluent from the hydrogenation reaction zone contains hydrocarbon components, such as normally liquid hydrocarbons and normally gaseous hydrocarbons admixed with unreacted hydrogen and by-product acid gases, such as hydrogen sulfide. This effluent is conventionally passed into a high pressure separation zone, after suitable cooling, for the separation therefrom of a hydrogen-containing gas stream having sufficient hydrogen content for reuse within the hydrogenation reaction zone and, therefore, conventionally this hydrogen stream is recycled to the conversion zone. Since hydrogenation reactions, by definition, consume hydrogen, suitable make-up hydrogen must be added to the system in order to maintain the proper hydrogen to hydrocarbon mol ratio within the reaction zone.

The remaining hydrocarbon effluent is next passed into a fractionation column which contains suitable vapor-liquid contacting devices, such as bubble cap trays, sieve-type trays, valve trays, suitable packing such as Berl Saddles, etc. Those skilled in the art are familiar with internal fractionation column designs and any of these conventional configurations will generally be suitable for the practice of this invention.

As previously mentioned, one embodiment of this invention includes operating the fractionation column under conditions sufficient to produce an overhead fraction containing normally gaseous hydrocarbons admixed with sufficient condensable hydrocarbons, e.g. $C_{6+}$ hydrocarbons, such that liquid reflux may be obtained to provide proper operation of the fractionation column.

This total overhead stream is cooled and passed into separator-receiver means from which normally gaseous hydrocarbons, including residual hydrogen sulfide and hydrogen gas are separated from the condensed liquid material.

The condensed liquid is withdrawn from the receiver means and a portion thereof returned to the upper section of the fractionation column as reflux thereon.

The separated gaseous portion containing hydrogen and hydrogen sulfide is now passed in accordance with one essential concept of the present invention into compression means for the compression thereof to a pressure of at least 25 p.s.i.g. higher than the pressure maintained in the receiver. Preferably, the compressing is performed with one stage of compression and a compression ratio of from 2:1 to 5:1.

The compressed gaseous portion is now contacted directly with the total overhead stream at a locus prior to the cooling thereof. This admixture is then passed into the previously described condensing means and into the separator-receiver. This technique enriches the normally liquid stream with the heavier of the normally gaseous hydrocarbons thereby improving upon the recovery of the desired products from the overhead of the fractionating column. Further, this recycle technique permits the creation of a circuit of gaseous components to keep the compressing machine loaded when distilling heavy stocks which do not have a high quantity of gaseous hydrocarbons under the relatively low pressure of distillation. The remainder of the compressed gaseous portion is removed from the system and, preferably, sent to fuel.

From the teachings presented herein, those skilled in the art will appreciate that the operating conditions for the fractionation column may vary over a wide range depending upon the characteristics of the multi-component feed mixture to be separated. Illustrative of one embodiment of this invention is the separation of the hydrocarbon effluent boiling mainly within the gas-oil boiling range and obtained from a hydrogenation conversion zone in a fractionating column maintained under fractionation conditions including an overhead temperature from 250° F. to 400° F. and a low pressure from 0 p.s.i.g. to 25 p.s.i.g. and a column bottoms temperature lower than 780° F., e.g. from 600° F. to 700° F.

Thus, by operating under the suggested conditions hereinabove, the hydrocarbon effluent of a hydrogenation conversion zone boiling mainly within the gas-oil boiling range is separated into desired products comprising a fuel fraction containing hydrogen and hydrogen sulfide, a normally gaseous hydrocarbon stream dissolved in a liquid gas-oil stream, and a bottoms product stream comprising relatively heavy gas-oil.

As can be seen from the description presented thus far, many desired products are obtained by the inventive method of distillation in a facile and economical manner. It is within the concepts of this invention that a side-cut stream comprising relatively light gas-oil also be removed from the fractionating column as a separate product stream. However, the invention is predicated primarily on the concept of compressing a portion of the overhead gases in a novel and economical way. The use of the compression step on the overhead vapor material enables increased recovery of desirable normally gaseous hydrocarbons and permits the operation of the fractionating column at a relatively low pressure thereby avoiding high temperatures in the bottom of the column.

The invention may be more fully understood with reference to the appended drawing which is a schematic representation of apparatus for practicing one embodiment of the invention.

DESCRIPTION OF THE DRAWING

Referring more particularly to the attached drawing, the initial multi-component feedstock comprising gas-oil boiling range material is brought into the system via line 10, mixed with recycle hydrogen from line 11, makeup hydrogen, if any, from line 12, preheated to incipient hydrogenation temperature by heater means, not shown, and passed directly into reactor 14 via line 13. Reactor 14 contains a fixed bed of solid catalyst particles of the type previously described. On the other hand, it is within the concepts of this invention for reactor 14 to be a plurality of fixed bed reactors or of the moving bed type, according to apparatus well known to those skilled in the art. It is not essentially in the practice of this invention that reactor 14 be of any particular configuration. Desirably, reactor 14 contains a single fixed bed of catalyst, although as previously mentioned, a plurality of catalyst beds, e.g. from 2 to 5, may be advantageously utilized. The reaction conditions are adjusted in accordance with the description previously mentioned in order to suitably reduce the sulfur and nitrogen content of the feed to predetermined levels.

The total hydrogenation effluent containing hydrogen, hydrogen sulfide, normally gaseous hydrocarbons, and normally liquid hydrocarbons is cooled, by means not shown, and passed via line 15 into high pressure separator 16. The pressure maintained in separator 16 is substantially the same as that maintained in reactor 14 allowing for conventional pressure drop through the system. In some cases, the material in line 15 is cooled by indirect heat exchange means, not shown, into which water is injected for quench purposes and for purposes of removing any ammonia type salts which may tend to plug up the heat exchanger. If water is injected into line 15 it may be rejected together with other separated contaminants from separator 16 via line 17. Hydrogen gas suitable for reuse in the reaction zone is withdrawn from separator 16 via line 11 and returned to reactor 14 in the manner previously described.

The remaining hydrocarbon effluent stream still containing residual amounts of hydrogen and hydrogen sulfide together with normally liquid hydrocarbons and normally gaseous hydrocarbons is withdrawn from separator 16 via line 18 and passed into fractionator column 19. Typically, the material in line 18 may be suitably preheated to distillation temperature by heater means, not shown. Fractionator 19 is of the conventional type for separating by distillation various desired products from a multi-component feed mixture of the type described herein.

Operating conditions are maintained in fractionator 19 sufficient to produce an overhead fraction comprising a mixture of normally liquid hydrocarbons, hydrogen, hydrogen sulfide, and normally gaseous hydrocarbons. This overhead fraction is passed via line 21 into admixture with recycle gas from a source hereinafter described from line 22, passed via line 23 into condenser 24, and the condensed material comprising partially liquid and partially vaporous compoents is introduced via line 25 into receiver 26. Suitable conditions are maintained in receiver 26 to produce a gaseous portion which is withdrawn via line 29 and a liquid light gas oil portion which is withdrawn via line 27.

A major portion of the material in line 27 is returned via line 28 as reflux into column 19. The gaseous portion in line 29 is passed into compressor 30 wherein its pressure is increased at least 25 p.s.i.g. and, preferably, 50 p.s.i.g. over the pressure maintained in receiver 26. Typically, this pressure will be in the range from 30 to 60 p.s.i.g. higher than the relatively low pressure maintained in receiver 26.

The compressed gaseous portion is withdrawn from compressor 30 via line 22 and a portion thereof is passed into admixture with the total overhead stream in line 21 at a locus prior to condenser 24. The remaining compressed portion is withdrawn from the system via line 31 and passed preferably into the refinery fuel system. The remaining liquid hydrocarbon now enriched in normally gaseous hydrocarbons is withdrawn from separator 27 and passed out of the system.

A bottom product stream comprising relatively heavy gas-oil is withdrawn from column 19 via line 20. In some cases, the bottoms product stream can be diverted by means not shown into indirect heat exchange with incoming feed material or with reboiler means in a side-cut stripper, if such is incorporated into the system of fractionator 19.

EXAMPLE

A commercial size gas-oil desulfurization plant will be used to illustrate the embodiments of the present invention. A virgin gas-oil charge stock, ° API gravity= 28.2, sulfur=1.90% (wt.), was charged at a rate of 3900 b.p.s.d. into a fixed bed hydrogenation reaction zone. The reaction zone was maintained under a pressure of 725 p.s.i.g. and a reactor outlet temperature of 750° F. Hydrogen was introduced into the reactor to maintain a hydrogen to hydrocarbon ratio of 1000 s.c.f./b.

The effluent of the reaction zone was separated at a pressure of 700 p.s.i.g. into a hydrogen stream which was recycled to the reaction zone and a hydrocarbon stream which was passed into a fractionation zone.

The hydrocarbon effluent ultimately introduced into the fractionation column had the following composition:

| Component: | Mols/hour |
|---|---|
| $H_2S$ | 13.51 |
| $H_2$ | 0.10 |
| $C_1$ | 1.44 |
| $C_2$ | 1.83 |
| $C_3$ | 1.83 |
| $iC_4$ | 0.85 |
| $nC_4$ | 1.20 |
| $iC_5$ | 0.90 |
| $nC_5$ | 1.22 |
| Plat. $C_6+$ | 0.10 |
| Lt. $C_6+$ | 7.01 |
| Gas oil 1 | 29.15 |
| Cut 2 | 35.45 |
| Cut 3 | 35.47 |
| Cut 4 | 35.24 |
| Cut 5 | 33.88 |
| Total | 199.18 |
| Lbs./hr. | 50,364 |
| M.W. | 252.85 |
| B.p.s.d. | 3995.2 |
| ° API | 32.3 |
| Lb./gal. | 7.193 |
| MM s.c.f.d. | ---- |

This feed was introduced at a temperature of 577° F. and a pressure of 4 p.s.i.g. The overhead of the column was maintained at a temperature of 336° F. and a pressure of 3 p.s.i.g. The bottom of the column was at a temperature of 668° F. and a pressure of 5 p.s.i.g.

The net overhead gas (line 31) had the following composition:

| Component: | Mols/hour |
|---|---|
| $H_2S$ | 13.32 |
| $H_2$ | 0.10 |
| $C_1$ | 1.44 |
| $C_2$ | 1.80 |
| $C_3$ | 1.77 |
| $iC_4$ | 0.79 |
| $nC_4$ | 1.08 |
| $iC_5$ | 0.71 |
| $nC_5$ | 0.91 |
| $C_6+$ MUG | 0.01 |
| Lt. $C_6$ NAP. | 0.07 |
| Dist. cut— | |
| 1 | -- |
| 2 | -- |
| 3 | -- |
| 4 | -- |
| 5 | -- |
| Total | 22.00 |
| Lbs./hr. | 847 |
| M.W. | 38.5 |
| B.p.s.d. | -- |
| Lb./gal. | -- |
| ° API | -- |
| MM s.c.f.d. | 0.20 |

The net overhead liquid (line 27) was light gas-oil having the following composition:

| Component: | Mols/hour |
|---|---|
| $H_2S$ | 0.19 |
| $H_2$ | -- |
| $C_1$ | -- |
| $C_2$ | 0.03 |
| $C_3$ | 0.06 |
| $iC_4$ | 0.06 |
| $nC_4$ | 0.12 |
| $iC_5$ | 0.19 |
| $nC_5$ | 0.31 |
| $C_6$+MUG | 0.09 |
| Lt. $C_6$ NAP | 6.94 |
| Dist. cut— | |
| 1 | -- |
| 2 | -- |
| 3 | -- |
| 4 | -- |
| 5 | -- |
| Total | 7.99 |
| Lbs./hr. | 1108 |
| M.W. | 138.7 |
| B.p.s.d. | 100.7 |
| Lb./gal. | 6.281 |
| °API | 56.0 |
| MM s.c.f.d. | -- |

Finally, a bottoms heavy gas-oil product, having a °API=31.1, was removed at a rate of 169.19 mols per hour.

The compressor (No. 30) operated with a suction pressure of 14 p.s.i.a., and a suction temperature of 100° F. The discharge pressure was 70 p.s.i.a. using a compression ratio of 5.0

The invention claimed:

1. Method for separating and recovering desired products from the hydrocarbon effluent of a gas oil hydrogenation conversion zone which comprises the steps of:
  (a) passing said hydrocarbon effluent to be separated in a fractionation zone at a temperature from 400° F. to 600° F. and a pressure from 2 p.s.i.g. to 50 p.s.i.g.;
  (b) removing from said zone a bottoms product comprising relatively heavy gas-oil at a temperature less than 780° F., and an overhead fraction comprising a mixture of normally liquid hydrocarbons, hydrogen, hydrogen sulfide, and normally gaseous hydrocarbons at a temperature from 250° F. to 400° F. and a pressure of 0 p.s.i.g. to 25 p.s.i.g.;
  (c) admixing said overhead fraction with a hereinafter specified gaseous stream;
  (d) cooling said admixture to a temperature from 60° F. to 120° F.;
  (e) separating the cooled admixture into a gaseous hydrocarbon fraction comprising hydrogen, hydrogen sulfide and normally gaseous hydrocarbons, and a liquid hydrocarbon stream comprising relatively light gas-oil;
  (f) compressing said gaseous hydrocarbon fraction of Step (e) to a pressure at least 25 p.s.i. higher than said overhead pressure of Step (b);
  (g) passing a portion of said compressed gaseous stream into admixture with said overhead fraction as specified in Step (c); and
  (h) recovering said gas-oil stream of Step (e), and the remainder of said compressed gaseous stream as separate product streams.

2. Method according to claim 1 wherein said compressing is performed with one stage of compression and a compression ratio of from 2:1 to 5:1.

3. Method according to claim 1 wherein said bottoms temperature is between 600° F. and 700° F.

References Cited

UNITED STATES PATENTS

| | | | |
|---|---|---|---|
| 2,786,802 | 3/1957 | Hanisian et al. | 208—105 |
| 2,943,041 | 6/1960 | Johnston et al. | 208—104 |
| 3,054,745 | 9/1962 | Forbes et al. | 208—104 |
| 3,356,608 | 12/1967 | Franklin | 208—103 |
| 3,359,198 | 12/1967 | Lengemann | 208—103 |

HERBERT LEVINE, Primary Examiner

U.S. Cl. X.R.

208—105, 350, 358